Patented June 10, 1941

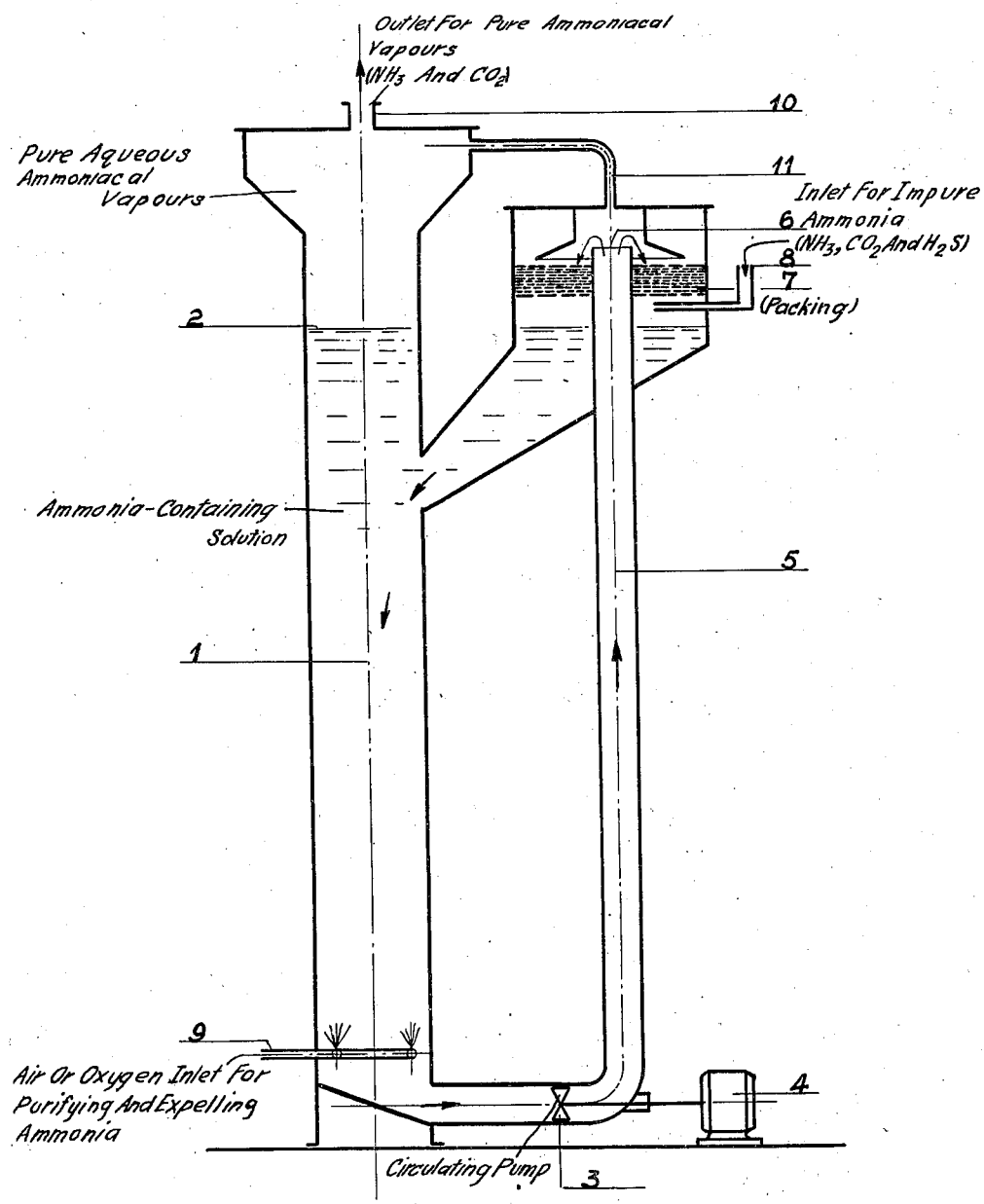

2,245,130

UNITED STATES PATENT OFFICE 2,245,130

PROCESS FOR THE SEPARATION OF AMMONIA AND SULPHURETED HYDROGEN

Joseph Guillissen, Uccle, Brussels, Belgium, assignor to Union Chimique Belge Societe Anonyme, Brussels, Belgium Application April 9, 1938, Serial No. 201,061
In Belgium November 29, 1937

4 Claims. (Cl. 23—193)

Applications have been filed in Belgium on November 29, 1937, and Great Britain December 6, 1937.

This invention relates to a process for the separation of ammonia and sulphureted hydrogen.

In industry impure ammoniacal solutions are frequently met with which are charged in particular with sulphureted hydrogen, and the utilisation of which is inconvenient. This is the case, for example, with the ammoniacal liquors from coke works or the ammoniacal liquors utilised in washing the gas in coke works with a view to purifying and separating these latter into sulphureted hydrogen and carbon dioxide. If it is desired to utilise these solutions for the manufacture of ammoniacal salts by distilling the ammonia and passing the gas distilled off into an ordinary acid saturator, the serious difficulty arises that precipitates of solid colored sulphides are formed with the impurities present in the technical acids generally employed. This is particularly the case with the impure sulphuric acid generally used for the manufacture of ammonium sulphate. These solid sulphides impart to the ammonium salts an undesirable coloration, influence unfavourably the form of the crystals and cause the formation of a salt of inferior quality.

One of the objects of this invention is to enable the separation to be effected without the application of external heat.

Another object is to provide a process which consumes less motive power than hitherto known processes and which can be carried out in a simple, relatively small apparatus.

A further object is to ensure quantitative separation of the ammonia and carbon dioxide on the one hand and of the sulphureted hydrogen on the other hand, particularly from ammoniacal liquors coming from coke works.

Another object of the invention is to effect the separation of ammonia and sulphureted hydrogen by the integral absorption of the ammoniacal vapours to be treated by a hot alkaline solution and to oxidise the sulphureted hydrogen present by means of gaseous oxygen, whereby it is transformed into non-volatile products.

A still further object of the invention is to provide a process which can also be employed, without any important modifications, principally for the separation of sulphureted hydrogen from the carbon dioxide.

Yet another object is to render it possible, by means of the process, to separate the cyanides of ammonia and the carbon dioxide present in the vapors.

In carrying out the invention, the circulating alkaline solution, in the body of which the separation of the ammonia and carbon dioxide respectively from the sulphureted hydrogen takes place, must present at all times a volume sufficient to render possible the condensation of the ammoniacal vapours and also the complete solution of the basic and acid gases which they contain. The condensation of the ammoniacal vapours and the oxidation of the sulphureted hydrogen and of the sulphides respectively formed in the alkaline solution causes the disengagement of considerable heat. In normal working the alkaline solution assumes as a consequence of this fact a high temperature located between 80° and 95° C.—a temperature at which the solubility of the gas is relatively small. The volume of the alkaline solution would consequently have to be relatively considerable as compared with the volume of ammoniacal liquors to be treated if recourse were not had to a vigorous circulation of a smaller quantity of alkaline solution through the reaction column, such as is provided according to the present process, inasmuch as after the oxidation of the sulphureted hydrogen and the expulsion of the ammonia and in some cases the carbon dioxide by blowing in a gas containing oxygen, the circulating solution is in fact in a state to take up new quantities of ammoniacal vapours for the purpose of purifying them.

The oxidation of the sulphureted hydrogen and the sulphides respectively by a gas containing oxygen is greatly favoured by the high temperature at which the reaction takes place and by the great dilution of the sulphureted hydrogen and sulphides respectively in the alkaline solution. It has been found that in these conditions the oxidation of the sulphureted hydrogen and sulphides respectively is rapid and complete even in the absence of a catalyser intentionally added and forming a carrier of oxygen and that traces of compounds of iron of the order of a few milligrammes per litre of solution coming from the walls of the apparatus are often sufficient to activate the destruction of the sulphureted hydrogen to such an extent that the purified ammoniacal vapours do not contain after condensation even traces of sulphur detectible by the aid of lead acetate. It may nevertheless be advantageous to add to the solution a catalyser of some kind carrying oxygen, such as a salt of iron or a mixture containing it, more particularly a mixture of a salt of iron and/or arsenite or arsenate.

A part of the alkaline solution which has become rich in sulphur and/or oxygenised compounds of sulphur, constituting particularly salts of ammonium with oxygen-containing acids of sulphur is removed in a continuous or intermittent manner from the circuit with a view to treating the said part by suitable means.

The gas blown into the reaction column, totally or partially deprived of its oxygen by the oxidation of the sulphureted hydrogen or sulphides respectively, causes the evacuation of the ammonia and also of the carbon dioxide which may be present.

The disengagement of heat caused by the oxidation reactions oxygen and the formation of salts of ammonia with the oxygen containing sulphur acids is so considerable that it greatly exceeds the losses by radiation, so that the quantity of water-vapour evacuated from the reaction column with the purified ammonia exceeds the amount of water introduced by the impure ammoniacal vapours and it is desirable to take suitable measures to avoid an undesirable diminution of the volume of the circulating alkaline solution.

The result of this is that without applying external heat the process renders it possible to separate the sulphureted hydrogen from the impure ammoniacal vapours coming from the distillation columns for ammoniacal liquors in coke works or from other impure ammoniacal solutions, to disengage from the reaction column ammoniacal vapours free from sulphur and to recover the sulphur in part in the form of elementary sulphur and in part in the form of salts of ammonium with oxygen-containing acids of sulphur.

The different characteristics of the process according to the invention are set forth below with reference to the accompanying drawing which illustrates by way of example a preferred method of carrying out the invention in practice.

According to this method of carrying out the process the apparatus consists essentially of a reaction column 1 which may or may not be furnished with filling or baffle plates and which is filled up to the height of the level 2 with an alkaline solution which is put in rapid circulation in it from the top towards the bottom by a circulating pump 3 driven by a motor 4. The circulating solution is rendered alkaline preferably by means of ammonia. It may contain a catalyser acting as a carrier of oxygen and it gradually becomes richer in sulphur or non-volatile compounds of sulphur as also in compounds formed by the absorbed hydrocyanic acid. It ascends in the pipe 5 up to the opening 6 of the latter from which point it reverses its direction in the form of copious rain falling on to a filling 7 of small height in order then to return to the reaction column 1. A pipe 11 provides communication with a conduit 10 in order to render possible the evacuation of the inert gas which may be carried towards the tube 5. The difference in height between the level of the liquid 2 and the opening 6 being chosen very small (in an installation capable of treating 8 cubic metres of ammoniacal liquor per hour it amounts for example only to from 50-100 centimetres), the motive power consumed by the circulating pump 3 is only very small, which renders it possible to cause the alkaline solution to circulate with an output sufficient to ensure the integral solution of the vapours in 7. The output of the pump 3 may amount to as much as 150 and more times the volume of the ammoniacal liquors to be treated, whilst expending only a fraction of the motive force which would be necessary for example for raising the solution with equal efficiency on to a trickling tower (scrubber).

When the installation is set in operation the circulating alkaline solution is carried up to a temperature located between 80° and 95° C. by means of live vapour. When this temperature is reached it is maintained during the succeeding period by the heat of the reactions without the application of external heat.

The ammoniacal vapours charged with sulphureted hydrogen, coming from the distillation columns of ammoniacal vapours in coke works or from other impure ammoniacal liquors at a temperature about the same or preferably slightly higher than that prevailing in the reaction column, are led in through a conduit 8 below the filling 7 which is of small height and in which they are completely absorbed by the circulating alkaline solution and carried towards the reaction column 1. In the latter they encounter a current of gas containing oxygen, for example compressed air, which is blown in at 9 and which ascends the reaction column 1, oxidises the sulphides present and escapes by a conduit 10, carrying away with it the ammonia as also the carbon dioxide together with a considerable quantity of aqueous vapours, whilst the sulphur, the non-volatile compounds of sulphur and the cyanides remain in the circulating alkaline solution. The purified ammonia vapour can be led towards the place where it is utilised, for example towards an acid saturator, when it is proposed to use the ammonia for the manufacture of salts of ammonium, such as sulphate or nitrate of ammonium.

One example of the operation of the process according to the invention in a semi-industrial test plant capable of treating 250 litres of impure ammoniacal liquor per hour will now be given. The distillation of this quantity of impure liquor releases in the form of vapours saturated with water:

|  | Kg. |
|---|---|
| $NH_3$ | 9.07 |
| $CO_2$ | 9.07 |
| $H_2S$ | 1.5 |

At the moment of entering the aforementioned apparatus through the tube 8, these vapours have a temperature of 88° C. They are completely absorbed in the filling 7 of small height by the ammoniacal solution which is in circulation and are conveyed into the reaction column 1 in which the sulphureted hydrogen or sulphides respectively formed are oxidised and transformed into elementary sulphur and partially into oxidised compounds of sulphur by means of the compressed air introduced at 9 at the rate of 10 cubic metres per hour. At the same time the ammoniacal vapours free from sulphur are discharged at 10. These facts are the cause of the periodical variation in the composition of the circulating solution. In one cycle of operation these variations will be as indicated in the following table where the values given for $NH_3$ relate to the volatile ammonia (with the exception of the small quantity which is changed into non-volatile ammonia):

|  | $NH_3$ | $CO_2$ | $H_2S$ |
|---|---|---|---|
| Before absorption of the impure ammoniacal vapours the solution contains in grammes per litre | 16.000 | 2.400 | 0.000 |
| Number of grammes of impure ammoniacal vapours received per litre of solution | 0.259 | 0.259 | 0.043 |
| Number of grammes per litre of solution contained in the solution after absorption of impure ammoniacal vapours | 16.259 | 2.659 | 0.043 |
| Loss by oxidation of $H_2S$ and by discharge of the ammoniacal vapours free from sulphur | 0.255 | 0.259 | 0.043 |
| Non-volatile $NH_3$ formed | 0.004 | | |
| Contents of solution after 1 cycle in grammes per litre | 16.000 | 2.400 | 0.000 |

About 5% of the compressed air introduced at 9 is consumed by the oxidising reactions. The remainder is discharged with the ammoniacal vapours freed from sulphur, the water content of which slightly exceeds that of the impure ammoniacal vapours, since for the reasons explained previously the temperature in the oxidising column 1 exceeds that of the impure ammoniacal vapours entering at 7 by about 0.7° C.

The ammoniacal vapours free from sulphur contain the entire amount of ammonia introduced by the impure vapours diminished by the quantity necessary of the formation of the ammonium salts of the sulphur oxy-acids. This quantity does not exceed 1.6% of the ammonia under treatment.

The circulating solution becomes enriched in time with these ammonium salts, but their presence has no influence on the efficient operation of the separation of ammonia and hydrogen sulphide contained in the distillation vapours of the impure ammoniacal solutions.

The following is the result of the analysis of a circulating ammoniacal solution after a prolonged operation:

Specific weight 21° C_____ 1.130
pH value _____ 9.2
$NH_3$ volatile _____gr./l__ 16.0
$NH_3$ non-volatile_____gr./l__ 73.8
Non-volatile combined sulphur___gr./l__ 131.7
  Constituted by—
    Grammes per litre as ammonium sulphate _____ 21.0
    Grammes per litre as ammonium sulphocyanate_____ 30.7
    Grammes per litre as thionates and thiosulphate of ammonia_ 80.0

As compared with other processes known at present, the novel process has the advantage of operating without the application of external heat, of consuming less motive power and of only requiring a very simple and much less voluminous apparatus, whilst ensuring the separation of the ammonia and of the carbon dioxide on the one hand and of the sulphureted hydrogen on the other hand contained in the ammoniacal liquors from the coke works or in other impure ammoniacal liquors.

I claim:

1. In a process for the separation of sulphureted hydrogen from the ammonia of impure ammoniacal solutions, the steps of: integrally absorbing the ammoniacal vapours coming from said solutions in a hot, continuously circulating ammonia-containing solution at a temperature of 80°–95° C.; subsequently oxidising the sulphureted hydrogen present by passing a gas containing oxygen through said solution so as to transform said sulphureted hydrogen into non-volatile products and simultaneously expel the purified ammonia as aqueous ammoniacal vapours to enable the rapidly regenerated solution to absorb more impure ammoniacal vapours, the temperature being produced and maintained at the value stated by the heat of the impure ammoniacal vapours and that developed during oxidation, vigorously circulating the rapidly regenerated solution through the absorber, and collecting said purified ammonia.

2. In a process for the separation of sulphureted hydrogen from the ammonia of impure ammoniacal solutions, the steps of: integrally absorbing the ammoniacal vapours coming from said solutions in a hot continuously circulating ammonia-containing solution at a temperature of 80°–95° C.; passing gaseous oxygen through said solution to oxidise the sulphureted hydrogen present so as to form non-volatile products and simultaneously expel the purified ammonia as aqueous ammoniacal vapours to enable the rapidly regenerated solution to absorb more impure ammoniacal vapours, the temperature being produced and maintained at the value stated by the heat of the impure ammoniacal vapours and that developed during oxidation, vigorously circulating the rapidly regenerated solution through the absorber; and continuously removing part of said ammoniacal solution for extraction of the products therefrom.

3. In a process for the separation of sulphureted hydrogen from the ammonia of impure ammoniacal solutions, the steps of: integrally absorbing the ammoniacal vapours coming from said solutions in a hot continuously circulating ammonia-containing solution at a temperature of 80°–95° C.; passing gaseous oxygen through said solution to oxidise the sulphureted hydrogen present so as to form non-volatile products and simultaneously expel the purified ammonia as aqueous ammoniacal vapours to enable the rapidly regenerated solution to absorb more impure ammoniacal vapours, the temperature being produced and maintained at the value stated by the heat of the impure ammoniacal vapours and that developed during oxidation, vigorously circulating the rapidly regenerated solution through the absorber; and intermittently removing part of said ammoniacal solution for extraction of the products therefrom.

4. In a process for the separation of sulphureted hydrogen from the ammonia of impure ammoniacal solutions, the steps of: circulating a hot ammonia-containing solution continuously through a vapour absorbing chamber at a temperature of 80°–95° C. and a reaction column; introducing the ammoniacal vapours to be purified, coming from said impure ammoniacal solutions at a temperature approximating that of the circulating solution, into said chamber, where they are absorbed by said hot ammonia-containing solution and carried into said reaction column; blowing a gas containing oxygen into said reaction column to oxidise the sulphides present and expel the purified ammonia and carbon dioxide; allowing the freed ammonia and carbon dioxide to escape from said column with said gas and directing it to a point required and leaving the sulphur and non-volatile compounds in said circulating ammoniacal solution, and vigorously circulating the rapidly regenerated solution through the absorber.

JOSEPH GUILLISSEN.